(12) United States Patent
Wilson et al.

(10) Patent No.: US 11,059,266 B2
(45) Date of Patent: *Jul. 13, 2021

(54) RIGID DISPLAY SHIELD

(71) Applicant: Racing Optics, Inc., Las Vegas, NV (US)

(72) Inventors: Bart E. Wilson, Las Vegas, NV (US); Stephen S. Wilson, Las Vegas, NV (US)

(73) Assignee: Racing Optics, Inc., Las Vegas, NV (US)

( * ) Notice: Subject to any disclaimer, the term of this patent is extended or adjusted under 35 U.S.C. 154(b) by 349 days.

This patent is subject to a terminal disclaimer.

(21) Appl. No.: 15/090,681

(22) Filed: Apr. 5, 2016

(65) Prior Publication Data

US 2017/0266917 A1 Sep. 21, 2017

Related U.S. Application Data

(63) Continuation of application No. 15/072,913, filed on Mar. 17, 2016.

(51) Int. Cl.
*B32B 7/12* (2006.01)
*B32B 27/08* (2006.01)
(Continued)

(52) U.S. Cl.
CPC ............... *B32B 7/12* (2013.01); *B32B 3/02* (2013.01); *B32B 7/02* (2013.01); *B32B 7/06* (2013.01);
(Continued)

(58) Field of Classification Search
CPC ......... B32B 2250/00; B32B 7/12; B32B 7/02; B32B 7/06; B32B 3/02; B32B 17/064;
(Continued)

(56) References Cited

U.S. PATENT DOCUMENTS 6,388,813 B1 5/2002 Wilson et al.
6,536,045 B1 3/2003 Wilson et al.
(Continued)

FOREIGN PATENT DOCUMENTS

JP 2002328613 A 11/2002
JP 2014032222 A * 2/2014
(Continued)

OTHER PUBLICATIONS

Translation of JP 2015-128896. See above for inventor and date.*
(Continued)

*Primary Examiner* — Patricia L. Nordmeyer
(74) *Attorney, Agent, or Firm* — Fitch, Even, Tabin & Flannery, LLP

(57) ABSTRACT

A protective shield includes a rigid base layer, and a flexible outer cushioning layer formed from a flexible film material laminated to an outer surface of the base layer. The outer cushioning layer includes two or more layers of flexible film laminated together via an intermediary adhesive. The protective shield also has a mounting adhesive layer applied on the lower surface of the shield. The mounting adhesive allows the shield to be removably mounted to a display surface, such as a touch screen surface for an electronic device. When the shield is properly mounted to the display surface, the outer layer formed from flexible film material faces away from the display surface. The flexible cushioning layer on the outer surface of the shield allows the shield to protect the display surface such that the display surface can withstand higher levels of impacts without breaking or shattering.

21 Claims, 6 Drawing Sheets

(51) Int. Cl.

| | |
|---|---|
| *B32B 27/36* | (2006.01) |
| *B32B 3/02* | (2006.01) |
| *B32B 7/06* | (2019.01) |
| *G06F 3/041* | (2006.01) |
| *B32B 7/02* | (2019.01) |
| *B32B 27/30* | (2006.01) |
| *G06F 1/18* | (2006.01) |
| *B32B 17/10* | (2006.01) |
| *G06F 3/044* | (2006.01) |

(52) U.S. Cl.
CPC ........ *B32B 17/10779* (2013.01); *B32B 27/08* (2013.01); *B32B 27/308* (2013.01); *B32B 27/365* (2013.01); *G06F 1/182* (2013.01); *G06F 3/041* (2013.01); *B32B 27/36* (2013.01); *B32B 2250/05* (2013.01); *B32B 2250/44* (2013.01); *B32B 2255/10* (2013.01); *B32B 2307/40* (2013.01); *B32B 2307/41* (2013.01); *B32B 2307/412* (2013.01); *B32B 2307/416* (2013.01); *B32B 2307/548* (2013.01); *B32B 2307/558* (2013.01); *B32B 2307/732* (2013.01); *B32B 2307/748* (2013.01); *B32B 2367/00* (2013.01); *B32B 2457/208* (2013.01); *G06F 3/044* (2013.01); *G06F 2203/04103* (2013.01); *G06F 2203/04107* (2013.01)

(58) Field of Classification Search
CPC . B32B 17/10779; B32B 27/08; B32B 27/308; B32B 27/36; B32B 27/365; B32B 2250/05; B32B 2255/10; B32B 2307/40; B32B 2307/41; B32B 2307/412; B32B 2307/416; B32B 2307/548; B32B 2307/558; B32B 2307/732; B32B 2307/748; B32B 2367/00; B32B 2457/208; B32B 2250/44; B29B 2911/00; B29C 73/10; G06F 1/182; G06F 3/041; G06F 3/044; G06F 2203/04103; G06F 2203/04107; Y10T 428/14
See application file for complete search history.

(56) References Cited

U.S. PATENT DOCUMENTS

| | | | |
|---|---|---|---|
| 6,555,235 | B1 | 4/2003 | Aufderheide |
| 6,847,492 | B2 | 1/2005 | Wilson et al. |
| 6,870,686 | B2 | 3/2005 | Wilson et al. |
| 7,070,837 | B2 | 7/2006 | Ross |
| 7,184,217 | B2 | 2/2007 | Wilson et al. |
| 8,044,942 | B1 | 10/2011 | Leonhard et al. |
| 8,693,102 | B2 | 4/2014 | Wilson et al. |
| 8,974,620 | B2 | 3/2015 | Wilson et al. |
| 9,061,542 | B1 | 6/2015 | Huang |
| 9,063,699 | B1 | 6/2015 | Huang |
| 9,092,195 | B1 | 7/2015 | Huang |
| 9,104,256 | B2 | 8/2015 | Wilson et al. |
| 9,128,545 | B2 | 9/2015 | Wilson et al. |
| 9,274,625 | B2 | 3/2016 | Wilson et al. |
| 9,283,731 | B2 | 3/2016 | Leonhard et al. |
| 9,295,297 | B2 | 3/2016 | Wilson et al. |
| 2002/0025441 | A1* | 2/2002 | Hieda ............... B32B 17/10018 428/440 |
| 2012/0075252 | A1 | 3/2012 | Dighde |
| 2012/0200816 | A1 | 8/2012 | Krasnov |
| 2013/0045372 | A1 | 2/2013 | O'Donnell |
| 2014/0072749 | A1 | 3/2014 | Leonhard |
| 2014/0162043 | A1 | 6/2014 | Schmid |
| 2014/0220283 | A1 | 8/2014 | Wilson |
| 2014/0247489 | A1 | 9/2014 | Wilson |
| 2015/0013891 | A1 | 1/2015 | Wilson |
| 2015/0177863 | A1 | 6/2015 | Wilson |
| 2015/0309609 | A1 | 10/2015 | Wilson |
| 2016/0166435 | A1 | 6/2016 | Wilson |
| 2016/0242963 | A1 | 8/2016 | Wilson |

FOREIGN PATENT DOCUMENTS

| | | | |
|---|---|---|---|
| JP | 2015128896 | A * | 7/2015 |
| KR | 20120001292 | A * | 1/2012 |
| WO | 03060563 | A2 | 7/2003 |
| WO | 04000540 | A2 | 12/2003 |
| WO | 2015002685 | | 1/2015 |

OTHER PUBLICATIONS

Derwent Abstract of KR 2012001292. See above for inventor and date.*
Translation of JP 2014-032222A. See reference above.*
NuShield Screen Protectors; printout from website at http://www.nushield.com/screen-protector-technology, taken Oct. 6, 2016.
Notification of Transmittal of the International Search Report and the Written Opinion the International Searching Authority, or the Declaration for PCT/US2017/018831 dated May 4, 2017; 14 pages.
Wikipedia, "Thermoforming"; Feb. 8, 2016; retrieved online Mar. 23, 2017 from https://en.wikipedia.org/w/index.php?title=Thermoforming&oidid=703986780>; 2 pages.
Written Opinion of the International Search Authority for PCT/US17/16951 dated Apr. 25, 2017; 10 pages.
Notification of Transmittal of the International Search Report and the Written Opinion of the International Searching Authority, or the Declaration for PCT/US17/16951 dated Apr. 25, 2017; 4 pages.

* cited by examiner

RIGID DISPLAY SHIELD

RELATED APPLICATION(S)

This application is a continuation of U.S. patent application Ser. No. 15/072,913, Filed Mar. 17, 2016, and titled "Rigid Display Shield," which is incorporated by reference in its entirety herein.

TECHNICAL FIELD

The present disclosure generally relates to protective shields. More specifically, the present disclosure relates to rigid shields that attach to displays to protect and improve the impact resistance of the display surface.

BACKGROUND

Electronic devices such as smart phones and tablets have display surfaces that produce and display visual output. For some devices, the display surface provides an operating interface (e.g., a touch screen interface) whereby a user can operate, control, or otherwise manipulate the electronic device. Many of these display surfaces are made of glass or other brittle materials that are subject to cracking, shattering, or otherwise breaking, or other forms of damage, for example, when a device is impacted or dropped. For some devices, particularly touch screen devices, breaking the display surface might render the entire electronic device entirely inoperable. The damage to repair such a display surface may be costly, and in some instances may even be irreparable.

Protective shields can be applied to display surfaces to protect display surfaces from mild wear and tear. For example, protective shields can be applied to video displays and/or touch screens to protect those display surfaces from scratches, abrasions, spills, stains, and the like. These protective shields can be removably applied so that when the shields become scratched, soiled, or otherwise impaired, a user can remove the shield and replace it with a new one. In this manner, the display surface can generally remain in a relatively high visibility working condition despite being subject to wear and tear. However, while protective shields provide protection against normal wear and tear, they are often ineffective in protecting the displays against impacts. That is, the protective shields do not reduce the likelihood that the displays will break when they encounter a high impact force.

SUMMARY

The present disclosure describes protective shields that attach to display surfaces such as video screens, touch screens, and the like. The protective shields include a base layer that is at least partly formed from a rigid material (e.g. glass). An outer layer formed from a flexible film material, such as polyethylene terephthalate (PET), is laminated to a front surface of the base layer via a bonding adhesive. The outer layer may include two or more layers of flexible film laminated together via an intermediary adhesive. The protective shield also has a mounting adhesive layer applied on the lower surface of the shield. The mounting adhesive allows the shield to be removably mounted to the display surface.

When the shield is properly mounted to the display surface, the outer layer formed from flexible film material faces away from the display surface. This provides a softer, flexible surface that absorbs or dissipates impact forces that would otherwise contact the display surface. This flexible outer layer may serve as a cushion that increases the impact resistance of the shield and/or the display surface. Providing this flexible cushioning layer on the outer surface of the shield as opposed to an inner surface (e.g., between the rigid base layer and the display surface) surprisingly increases the ability of the shield and the display surface to withstand impacts without breaking or shattering.

DETAILED DESCRIPTION

Figure 1:
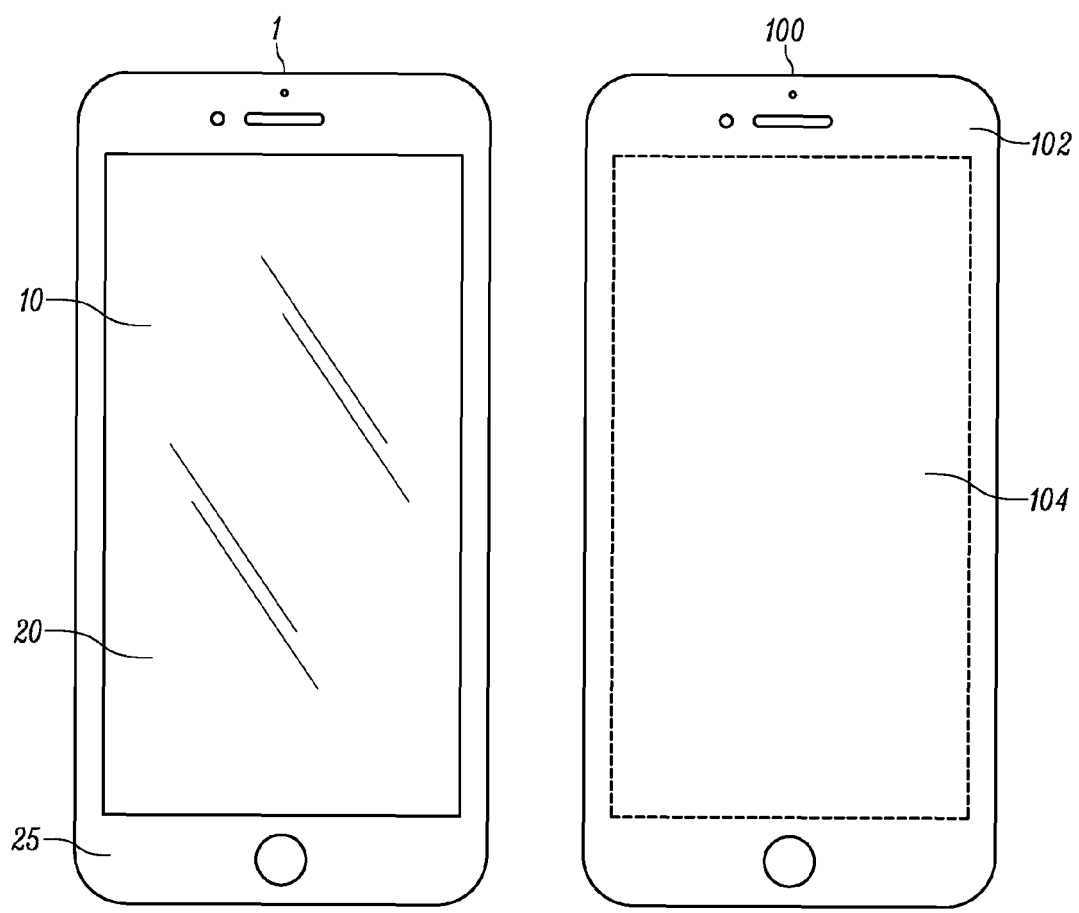
FIG. 1 is an exploded top view of an electronic device with an example of a protective shield mounted thereon.

The present disclosure describes examples of a removable protective shield. The protective shields (also referred to as protectors, or just shields) are configured to attach to, protect, and be removed from a display surface. The display surface can be any surface designed to display media, in particular, electronic media. The display surfaces protectable by the described shields can include video display screens (e.g., televisions, monitors, digital picture frames, advertising displays, etc.), touch screens (e.g., interface screens for mobile phones, tablets, mobile computing devices, touch screen monitors, etc.), or other surfaces designed to display information (e.g., watch faces, clocks, mirrors, etc.). In many cases, the display surfaces will comprise or be made from glass or other brittle material. Such brittle surfaces are prone to fracture, shatter, or otherwise break upon exposure to impact or other forces. The described protective shields are designed to improve the impact resistance of the display surfaces so that they can withstand higher levels of impact without breaking.

Protective shields can be formed from flexible materials or stiffer, more rigid materials. The flexible shields and the rigid shields each have their benefits and their drawbacks. For instance, shields formed from flexible materials, such as plastic or PET, are often more durable than rigid shields from an impact perspective. Because they are flexible, they do not break or shatter upon exposure to impact or tensile forces as easily as some rigid shields. However, flexible shields may also be more difficult to install and remain installed on a display surface. This is because the flexibility of the shield can result in wrinkling, warping, or bending that can cause edges of the shield to lift off or peel away from the display surface. Moreover, flexible shields may also be more inclined to generate optical artifacts when employed in perimeter mounting screen protectors. Examples of such perimeter mounting protectors are described in disclosures of U.S. patent application Ser. No. 12/780,443 (now issued as U.S. Pat. No. 9,128,545), and all applications that claim priority thereto, including U.S. patent application Ser. No. 13/838,311 (now U.S. Pat. No. 8,974, 620), Ser. No. 14/599,176 (now U.S. Pat. No. 9,104,256), Ser. Nos. 13/186,690, 14/642,406, and 14/794,156, each of which are hereby incorporated by reference in their entirety. These perimeter mounting protectors can lift the central portion of the shield away from the, which can create a cushion of air between the shield and the protected surface that can serve to protect the display surface. However, these perimeter mounting shields can generate optical artifacts, such as Newton rings, moiré interference patterns, chromatic interference, and the like, when a protective layer contacts or otherwise comes too close to the touch screen. These optical artifacts are more likely to occur with flexible shields, which can sag in the center.

Rigid shields, such as shields made from glass or other stiff materials also have both benefits and drawbacks. For example, because they are rigid, the shields are typically easier to install, and tend to remain installed on a display. This is particularly true for the perimeter mounting shields, as the rigid shields are less likely to sag into contact with or close proximity with the protected display surface. However, rigid shields do not typically improve the impact resistance of the protected display surfaces as well as flexible shields. Because they are inflexible, the rigid shields do not absorb impact forces, which often results in a significant portion of impact forces being transmitted to the protected display surfaces. These transmitted forces can cause the display surface to break or damage, even if the rigid protector itself remains intact.

The present disclosure describes examples of removable rigid protective shields that can improve the impact resistance of the protected display surface. The described shields therefore provide benefits of a rigid shield (e.g., easy installation, inhibiting formation of Newton rings, etc.), while also providing the improved impact resistance like a more flexible shield. In some situations, the shields may be designed to crack or break before the underlying protected screen. That is, a force that may otherwise cause an unprotected display surface to break may instead cause the protective shield to break in a manner that absorbs and/or dissipates the impact force such that the underlying display surface remains intact. In such a situation, the damaged shield can then be removed and replaced with a new shield, keeping the protected display surface relatively unharmed.

The protective shields described herein also protect the display surfaces against wear and tear such as scratches, abrasions, stains, and the like. In this manner, the shield—not the display surface—will absorb the wear and tear, keeping the display surface relatively clean and unharmed. Once the shield is damaged enough to inhibit the viewability or operability of the display surface, the shield can be removed to expose a generally clean display surface. A new shield can then be re-installed on the protected surface, if desired.

The described protective shields improve the impact resistance by laminating or adhering one or more cushioning layers to an outer surface of a rigid layer. The cushioning layers are preferably formed from flexible material (e.g., flexible PET), and can include one or more flexible film layers laminated together. The rigid layer is preferably formed from a rigid or stiff material (e.g., glass), which forms a base layer of the shield giving the shield a stiffness or rigidity.

It was surprisingly discovered that providing these flexible film layers on the outer surface of the shields (i.e., on the side of the shield opposite that of the protected display surface) improved the impact resistance of the shield and/or the display surface protected by the shield. It was also discovered that providing the flexible cushioning layer on the outside of the shield demonstrated an increase in the impact resistance over similar shields that included a flexible film layer on an inner side of the shield (i.e., between the rigid layer of the shield and the protected display surface).

FIG. 1 shows an exploded view of an electronic device 1 with a display surface 10 protected by a protective shield 100 mounted thereon. More specifically, the electronic device 1 is a smart phone (e.g., an IPHONE) with a touch operable surface (i.e., a touch screen) that allows a user to operate the electronic device 1 by capacitive touch. However, while FIG. 1 shows the device 1 as a touch operable smart phone, it should be understood that the presently described shields may be used with any device that has a brittle or breakable display surface.

The display surface 10 defines an operating area 20 that is surrounded by a border area 25. The operating area 20 represents the central, or primary viewing area of the display surface 10, and may correspond with a digital screen that changes display based on the operation of the electronic device. The operating area 20 may be partially or fully touch sensitive, providing a user interface that allows a user to manipulate, control, or otherwise operate the device 1. The operating area 20 may be disposed adjacent or enclosed within a border area 25.

The border area 25 may be an inactive area that surrounds the operating area 20, and may include features such as brand labelling, graphics, speakers, mechanical buttons, LED lights, non-graphical displays, and the like. In some instances, the border area 25 may include touch sensitive portions (e.g., touch sensitive buttons or icons) that also allow operation of the device 1. In some instances, the border 25 may exhibit all the functionality of the operating area 20. For example, in some instances where the electronic device 1 comprises a full display that extends between all edges of the device, the border area 25 may simply represent an outer area of the fully operating display. In other examples, the border area 25 may be inactive, or largely inactive, such that the border provides limited or no operable functionality. In some examples, the display surface 10 may be curved, or non-planar, such that at least a portion of the border area 25 is on a different plane than the operating area 20.

The operating area 20 of the display surface 10 is protected by a shield 100, which is disposed over the display surface 10. In some configurations (including the examples shown in FIGS. 2 and 3), the shield 100 attaches to the display surface 10 so that the outer peripheral portion 102 of the shield 100 adheres to the border area 25 of the display surface 10. In these examples, the attached shield 100 may form a space, or an air gap between the central portion 104 of the shield 100 and the display surface 10, as described in the references in the patent family of U.S. Pat. No. 9,128,545 (hereby incorporated by reference in its entirety). In other examples (including the example shown in FIG. 4), the shield 100 may attach to a majority of the display surface 10, including the operating area 20, by a full adhesive, or an adhesive applied to all, or substantially all of the underside of the shield 100.

Figure 2:
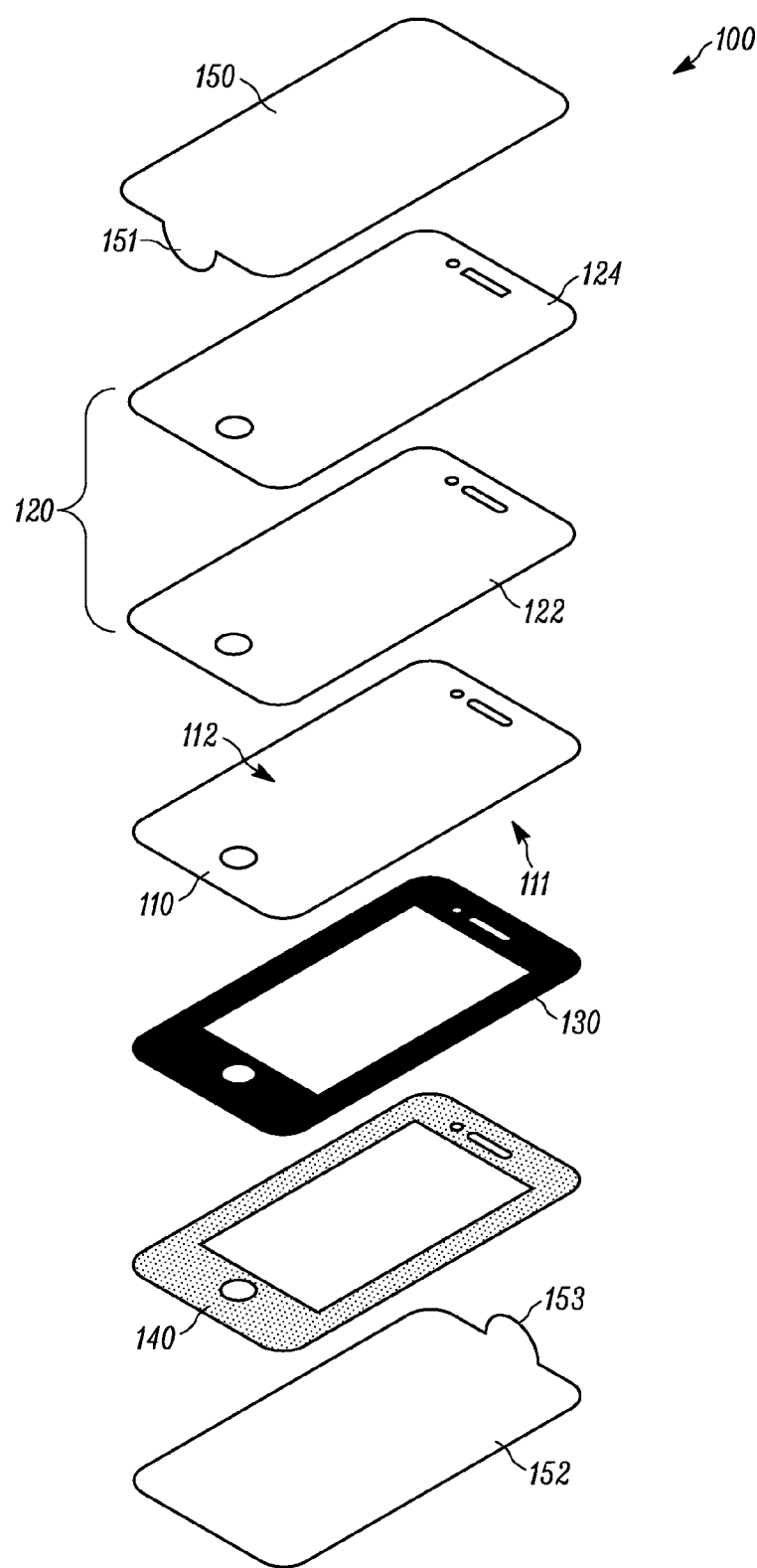
FIG. 2 is an exploded view of a protective shield in accordance with examples described herein.

FIG. 2 is an exploded view of a more detailed example of the protective shield 100 of FIG. 1. The protective shield 100 has several layers, which can all be laminated together, for example, via adhesives or adhesive layers, to form a single protective shield 100. In some embodiments, the shield 100, and the layers that form the shield 100, are transparent, or at least translucent or partially transparent, so that a display surface protected by the shield 100 can be seen and readily observed by a user. However, in some embodiments the shield 100 and/or some or all layers of the shield 100 may comprise a tint, color, polarization, coating, privacy screen feature, or other effects that render the shield 100 less than entirely transparent, provided that at least some portion of a display surface protected by the shield 100 is visible. However, as will be discussed below, some layers (e.g., mask layer 130 or other layers that may not cover the operating area 20 of the display surface 10) may be intentionally darkened or opaque, so as to occlude or hide air bubbles and other objects.

The shield 100 has a thickness that can vary depending on the intended function of the shield 100 and the display surface 10 that it is designed to protect. The shield 100 is generally thick enough to provide stiffness and rigidity to the shield, and to provide the appropriate level of protection, but is thin enough to maintain visibility and keep a low profile. In embodiments where the shield 100 is designed to protect a touch sensitive surface, the thickness of the shield will be thin enough to maintain touch sensitivity of the touch screen through the attached shield 100. That is, the shield 100 should not be thicker than the capacitive reach of the touch screen, in which case the touch sensitivity of the touch screen would be diminished through the shield. For some touch screen devices, the thickness of the shield should generally not exceed about 1 mm or about 40 mils (1 mil is equivalent to $1/1000^{th}$ of an inch). In some embodiments, the total thickness of the shield may be between about 20 mils (about 0.5 mm) and about 30 mils (about 0.75 mm). In still further embodiments, the total thickness of the shield 100 may be between about 25 to about 27 mils, or between about 0.65 to about 0.67 mm. Of course, in other environments and in other situations the shield 100 may be significantly thicker or thinner, depending on the touch sensitivity of the touch screen and other factors.

The example shield 100 of FIG. 2 is shown having seven separate layers. It should be appreciated that in some embodiments, the shield may include more or less layers. It should also be appreciated that some layers, including some adhesive layers that bond the layers of the shield 100 together, are not shown in FIG. 2. The layers of FIG. 2 include a base layer 110, a cushioning layer 120 formed by a first 122 and second outer layer 124 laminated together, a mask or spacer layer 130, an exposed or mounting adhesive layer 140, and two removable liner layers 150 and 152.

The base layer 110 forms a rigid or stiff layer, and is formed from a rigid or stiff material. For example, the base layer 110 can be, or can include glass, reinforced glass, tempered glass, toughened glass, or other versions of safety glass to inhibit the glass from splintering into large shards when it breaks. Some versions of the base layer 110 may be formed from a flex-glass material, which comprises a glass and plastic mixture thereby providing a material that has more flexibility than standard glass. In some examples, the base layer 110 can be formed from other rigid materials, including rigid plastics.

The base layer 110 is typically thick enough to provide stiffness and rigidity to the shield, but thin enough to avoid generating visibility or manipulation issues. In some examples, the base layer 110 has a thickness between about 7 mils to about 16 mils, or more specifically between about 10 mils and about 15 mils (or about 0.25 mm to about 0.38 mm). In some examples, the base layer itself may be about 11 mils to about 12 mils, or about 0.3 mm in thickness.

Attached to the upper, or outer surface 112 of the base layer 110 is an outer cushioning layer 120. The outer cushioning layer 120 can be formed of multiple layers, as shown in FIG. 2. For example, the outer cushioning layer 120 can be formed from a lower layer 122 and an outer layer 124 laminated together via an adhesive layer (not shown in FIG. 2). In some examples, the outer cushioning layer 120 may include only one layer, or it may include three or more layers laminated together.

The components of the outer cushioning layer 120 are formed from flexible materials such that the outer cushioning layer 120 itself is flexible. For example, the films forming the cushioning layer may comprise PET, polycarbonate, acrylic, and the like. The thickness of the layers can vary depending on the intended application of the shield. For instance, the layers 122 and 124 of the cushioning layer 120 may each have a thickness of about 3 mils, about 4 mils, about 5 mils, or about 0.1 mm, thereby forming a cushioning layer 120 with a total thickness of between about 6 mils to about 10 mils (e.g., about 8 mils), or about 0.2 mm. In this manner, the intermediary adhesive layer that laminates the layers together may have a negligible thickness that does not significantly contribute to the overall thickness of the cushioning layer 120 or the shield 100. However, the adhesive layer can also help serve as a shock absorber, cushioning layer, or impact dissipating layer that helps the shield 100 increase the impact resistance of the protected display surface 10.

The layers of the cushioning layer 120 are bonded or laminated together, and in some instances, may form a permanent laminate. A "permanent" laminate (or permanent bond, or permanent adhesive), as that term is used throughout this application, refers to a lamination bond that is stronger than laminates, bonds, or adhesives that are referred to as removable. A permanent laminate, as used herein, intends to bond two surfaces together, and maintain that bond for the operable life of the shield, but such a laminate may not be literally permanent, as heat, chemicals, tools, or the effects of time, may cause a permanent laminate to de-laminate.

In some embodiments, the outer cushioning layer 120 will be virtually transparent and/or clear, and despite being comprised of multiple layers, will have an appearance of a single layer film. In this manner, each of the layers of the outer cushioning layer 120, including the film layers 122 and 124, and the intermediary adhesive layer will have a refractive index that is matched, generally within 0.2, which limits the amount of internal reflections within the cushioning layer 120 that are visible to human eyes.

The cushioning layer 120 may be bonded or laminated to the outer surface 112 of the base layer 110 via a bonding adhesive layer. Like the intermediary adhesive layer bonding the layers of the cushioning layer 120 together, the bonding adhesive layer laminating the cushioning layer 120 to the base layer 110 may also have a negligible thickness, and it may help serve as a shock absorber, cushioning layer, or impact dissipating layer. The bonding adhesive layer may form a permanent laminate between the cushioning layer and the base layer.

One or more layers of the cushioning layer 120 may be coated with a hard coat layer. Ideally, at least the outer-most layer 124 of the cushioning layer 120 will have a hard coat (if any layers have such a coat, which may not be necessary in all embodiments), so that the outer-most surface of the protective shield 100 is hardened, thereby improving the scratch and abrasion resistance of the shield. The hard coat layer may provide the outer surface of the cushioning layer with a pencil hardness value of about 6H. Since the outer cushioning layer 120 may generally be softer than the inner base layer 100, these outer layers may tend to scratch more easily than a basic glass or rigid shield. Accordingly, coating the outer-most layer 124 of the cushioning layer 120 can increase the scratch resistance, while still offering the benefits of a soft, cushioning outer layer 120 to absorb and dissipate impacts on the protected display surface 10. In some examples, lower or intermediary layers of the cushioning layer 120 may also be provided with a hard coat.

An annular spacer layer 130, or a mask, may be laminated to a lower, or inner surface 112 of the base layer 110. An exposed adhesive, or a mounting adhesive layer 140 may also be applied to the inner surface 112 of the base layer 110 and/or to the spacer layer 130. In the embodiment shown in FIG. 2, the spacer layer 130 is applied directly to the inner surface 112 of the base layer 110.

The mounting adhesive layer 140 is configured to removably attach the shield 100 to the display surface 10. That is, the adhesive layer 140 is configured so that a user may remove the attached shield 100 when it becomes damaged or soiled, and re-install a new shield on the display surface 10. The adhesive layer 140 may be configured so as not to leave significant amounts of (or any) residue behind on the surface 10 after it is removed. That is, the adhesive layer 140 is configured to remain with the shield 100 when it is removed from the display surface 10. The spacer 130 and/or the adhesive layer 140 may be opaque or dark to hide or disguise artifacts or objects such as bubbles and dust that may form between the shield 100, the adhesive 140, and the display surface 10.

In some examples, the adhesive can be a pressure sensitive adhesive (e.g., an acrylic adhesive). The adhesive may also be a self-wetting adhesive that facilitates pressing out air bubbles that may form after installation between the shield 100, the adhesive 140, and the display surface 10. In one example, the adhesive can be made to have a linear peel force of about 10 to about 20 g/mm (per ASTM D903).

In FIG. 2, the mounting adhesive layer 140 is applied to the spacer 130, and has a shape/configuration that corresponds to that of the spacer 130. This shape/configuration is designed to correspond to that of the border 25 of the display surface. In this manner in FIG. 2, the spacer 130 and the adhesive layer 140 have a shape and configuration that corresponds to the shape and configuration of a border area 25 of a display surface 10. Similarly, the central portion 104 of the shield (see FIG. 1) corresponds to the central or operating area 20 of the display surface 10. Because the central portion 104 of the shield does not have adhesive, attaching the protector to the touch screen device will not adhere the protector to the central or primary display. This may inhibit, mitigate, reduce, prevent, or even eliminate the formation of undesirable optical artifacts such as floating air bubbles, Newton rings, moiré interference patterns, and chromatic interference, while still maintaining touch sensitivity of the touch screen through the attached protector.

Depending on the thickness of the spacer 130 and the adhesive 140, the shield 100 may also form a space, air gap, or air bearing between an attached shield and the display surface in a resting configuration (i.e., in a configuration where the shield is not being pressed). That is, the spacer 130 and/or the adhesive layer 140 can be used to provide a spacing, an air gap, a planar bearing, or to otherwise lift the central portion of the shield 100, in particular the inner surface 112 of the base layer 110 of the shield 100 off the display surface 10 that it attaches to. In some examples, the spacer has a thickness of between about 1 to 3 mils, more specifically, about 2 mils, or about 0.05 mm. The thickness of the adhesive can vary, and in some examples is between about 3 mils and about 5 mils, or about 0.07 mm thick.

Accordingly, the combined spacer is between about 6 mils and 8 mils, or about 0.12 mm thick. It should be noted that in some examples, the spacing may be provided by only the adhesive layer 140. That is, the adhesive layer 140 may be applied directly to the base layer 110 about the outer periphery 102 of the shield 100 without an intermediary spacer 130 there between.

FIG. 2 also shows tabbed liner layers 150 and 152 attached to the outer and inner surface of the shield. The thickness of the liner layers can be between about 1 mil to about 3 mils, or about 0.05 mm. The inner liner layer 152 is used to protect the adhesive layer 140 prior to application to a display surface 10. When a user wishes to apply the shield 100, the inner liner layer 152 may be removed to expose a tacky adhesive layer 140, and the shield may then be pressed against the display surface 10. The inner liner layer 152 may include a tab 153 that facilitates grasping and removal of the inner liner layer 152. Likewise, the outer surface of the shield 100 may also have a liner layer 150 that protects the cushioning layer 120, or the outer layer 124 of the cushioning layer 120 before it is used. Upon installation of the shield 100, a user may peel away the outer liner layer 150 by grasping and pulling on the tab 151. It should be noted that not all embodiments of the shield 100 need to include the outer liner layer 150, as a hard coating on the outer surface 124 may be sufficient to protect the shield.

Figure 3:
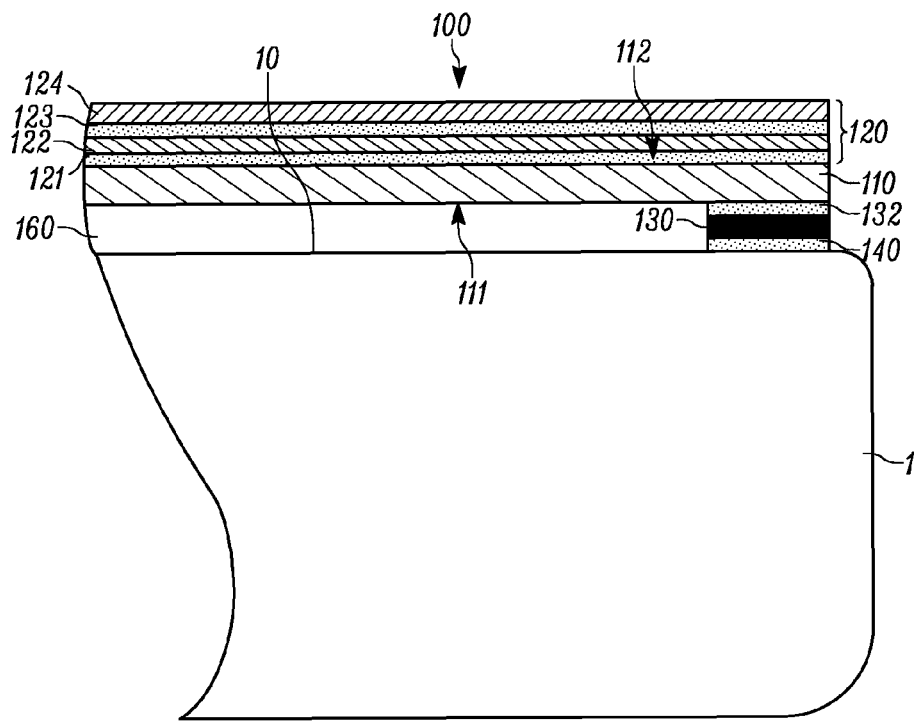
FIGS. 3 and 4 are cross sectional views of protective shields attached to a display surface in accordance with examples described herein.

FIG. 3 shows a cross section of a shield 100 attached to a display surface 10 of a device 1. The shield 100 of FIG. 3 may be the same shield of FIG. 1 and/or FIG. 2, although in FIG. 3, intermediary adhesive layers 121, 123, and 132 are shown, and the liner layers 150 and 152 are removed. The shield 100 comprises a base layer 110, comprised of a rigid material. Laminated to the base layer 110 by way of a bonding adhesive layer 121 is a cushioning layer 120. The adhesive layer 121 may form a permanent laminate so that the cushioning layer 120 does not readily remove from the base layer 100.

The cushioning layer 120 itself comprises an inner, or lower cushioning layer 122 and a second or outer cushioning layer 124, laminated together with an intermediary adhesive layer 123, which may also form a permanent laminate. The cushioning layer 120 is arranged so that when the shield 100 is installed on a device 1, the softer cushioning layer 120 faces away from the display surface 10 and/or the device 1, thereby absorbing impacts and other forces that would otherwise contact the base layer 110. Because the layers 122 and 124 of the cushioning layer 120 are generally formed from flexible materials, the cushioning layer provides a softer surface that can absorb and dissipate such impacts. By employing multiple flexible layers 122, and 124 (and in some embodiments even further layers could be applied), the cushioning layer 120 also introduces added adhesive layers (e.g., layers 121 and 123) that, while they may have negligible thickness, still absorb and dissipate impacts.

In some examples not shown, the shield 100 may further include additional layers laminated to the outer surface of the shield 120. These additional layers can be peel away or removable layers that can be torn away from the shield when they become scratched or soiled, thereby exposing a clean new layer there beneath.

FIG. 3 shows the spacer 130 and adhesive layers 140 laminated to the lower, or inner surface 111 of the base layer 110 via another adhesive layer 132. The adhesive layer 132 may have a negligible thickness and form a permanent laminate so that the spacer 130 and adhesive layer 140 remain attached to the shield 100 during operation. The thicknesses of the layers of FIG. 3 are shown enlarged for demonstrative purposes, and are not drawn to scale.

Depending on the intended use of the shield 100, the combined thickness of the spacer 130 and the adhesive layer 140 can vary. For example, the combined thickness of the spacer 130 and the adhesive layer 140 may be thick enough to lift the shield 100 off the display screen (e.g., so that the inner surface 111 of the base layer 110 does not come into contact or close proximity with the operating area 20 of the display surface 10), and to form an air gap 160 without creating a separation so large that the touch sensitivity of a touch screen display surface 10 is compromised or negatively affected. In some examples, it will be desirable to maintain a separation distance between the shield 100 and the display surface 10 of at least about 1 mil, or even at least about 3 mils (or about 0.8 mm), depending on the shield materials and the display surface, to inhibit or prevent formation of optical interference or artifacts. Thus, in one example, the combined thickness of the spacer 130 and the adhesive layer 140 can be between about 3 mils and about 7 mils, or between about 0.07 mm and about 0.18 mm. In some examples, the combined thickness can be between about 4 mils and about 6 mils, or about 0.10 mm, and about 0.12 mm. In still more specific examples, the combined thickness can be between about 4 mils and about 5 mils, or about 0.12 mm.

As noted, where the display surface 10 is a touch screen, the shield 100 is configured so that the total separation between the outer surface of the shield and the display surface 10 is small enough so that the touch screen maintains touch sensitivity through the shield 100. That is, the combined thickness of the mounting adhesive layer 140, the spacer 130, the base layer 110, the cushioning layer 120, and all intermediary adhesive layers and coatings, is small enough that a user can still operate the touch screen through the attached shield 100, preferably without a noticeable drop-off in touch sensitivity. This maximum total thickness value will depend at least in part on the touch sensitivity of the touch screen itself, but can be, for example about 20 mils, about 40 mils, or about 80 mils.

In some examples, the base layer 110 is sufficiently stiff so that the central portion of the base layer 110 and/or the shield 100 remains separated from the operating area 20 of the display surface 10 in the resting configuration. However, in some instances the shield 100 may still sag or droop, and come into contact with or close proximity to the display surface, thereby generating optical artifacts or interference. To help maintain spacing and prevent the formation of optical artifacts, the shield 100 may employ other features that help keep the base layer 110 of the shield 100 off the display surface 10. For example, the shield 100 may be pre-formed with a curl or convex curvature (e.g., formed by molding), wherein the convex curvature facilitates maintaining separation between the base layer 110 and the central portion of the display surface 10 in the resting configuration (i.e., in a configuration where the shield is not being pressed, touched, or otherwise manipulated). Shields with such pre-formed curl or curvature are described in U.S. provisional application No. 62/293,482, which is hereby incorporated by reference in its entirety.

FIGS. 2 and 3 show examples of a shield 100 that create an air gap 160 or spacing between the shield 100 and the display surface 10. However, some examples of the presently described shields will not create an air gap, and will not lift the shield 100 or the base layer 110 off the display surface 10. In such examples, the adhesive layer 140 may be a full adhesive that is applied to all, or substantially all of the inner surface 111 of the base layer 110. In such an example, the shield will not provide an air gap, but will essentially adhere the entire shield, or a majority of the shield to the display surface. In this manner, the shield 100 may not include a spacer 130 or a mask.

Figure 4:
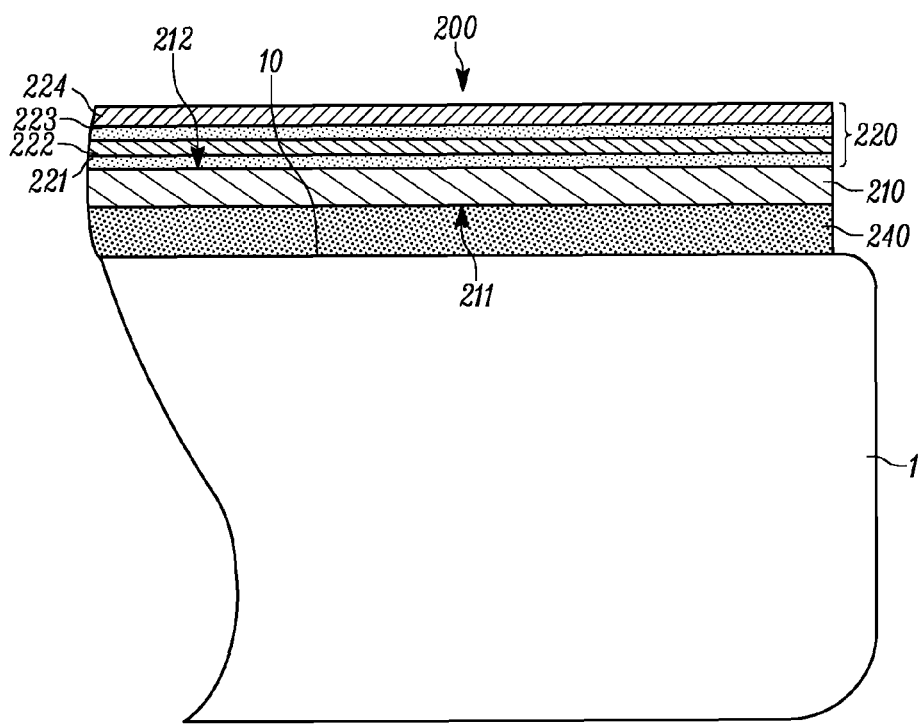

FIG. 4 shows a cross sectional view of an example shield 200 that employs a full adhesive layer 240 attaching the shield 200 to the display surface 10 of a device. The adhesive layer 240 is generally applied to the full inner surface 211 of the base layer 210 of the shield 200. The adhesive layer 240 is applied so that the shield 200 may still be removed from the display surface 10 without leaving residue from the adhesive layer 240 behind. The adhesive layer 240 is configured to have a tackiness that inhibits edges and corners of the shield 200 from lifting or raising, or otherwise from delaminating without an intent to remove the shield 200. The adhesive layer 240 may be a pressure sensitive adhesive, and/or it may be self-wetting so that bubbles that form between the shield 200 and the display surface 10 can be pressed out.

Laminated to the outer surface 201 of the base layer 210 via an adhesive 221 is a cushioning layer 220, which cushioning layer 220 comprises two individual layers 222 and 224 laminated together by adhesive layer 223. In this manner, the cushioning layer 220 of FIG. 4 is similar or the same as that of cushioning layer 120 of FIGS. 2 and 3. In both embodiments shown in FIGS. 2 and 3, and in FIG. 4, the cushioning layer is laminated to the outer surface of the shield 200, thereby absorbing and dissipating impacts that contact the shield 200 to improve the impact resistance of the protected display surface 10. In some examples, all layers of the shield 200, or at least all the non-opaque layers have refractive indexes matched to within about 0.2 to inhibit internal reflections and provide an appearance of a single layer shield. As with FIG. 3, The thicknesses of the layers of FIG. 4 are shown enlarged for demonstrative purposes, and are not drawn to scale.

Figure 5:
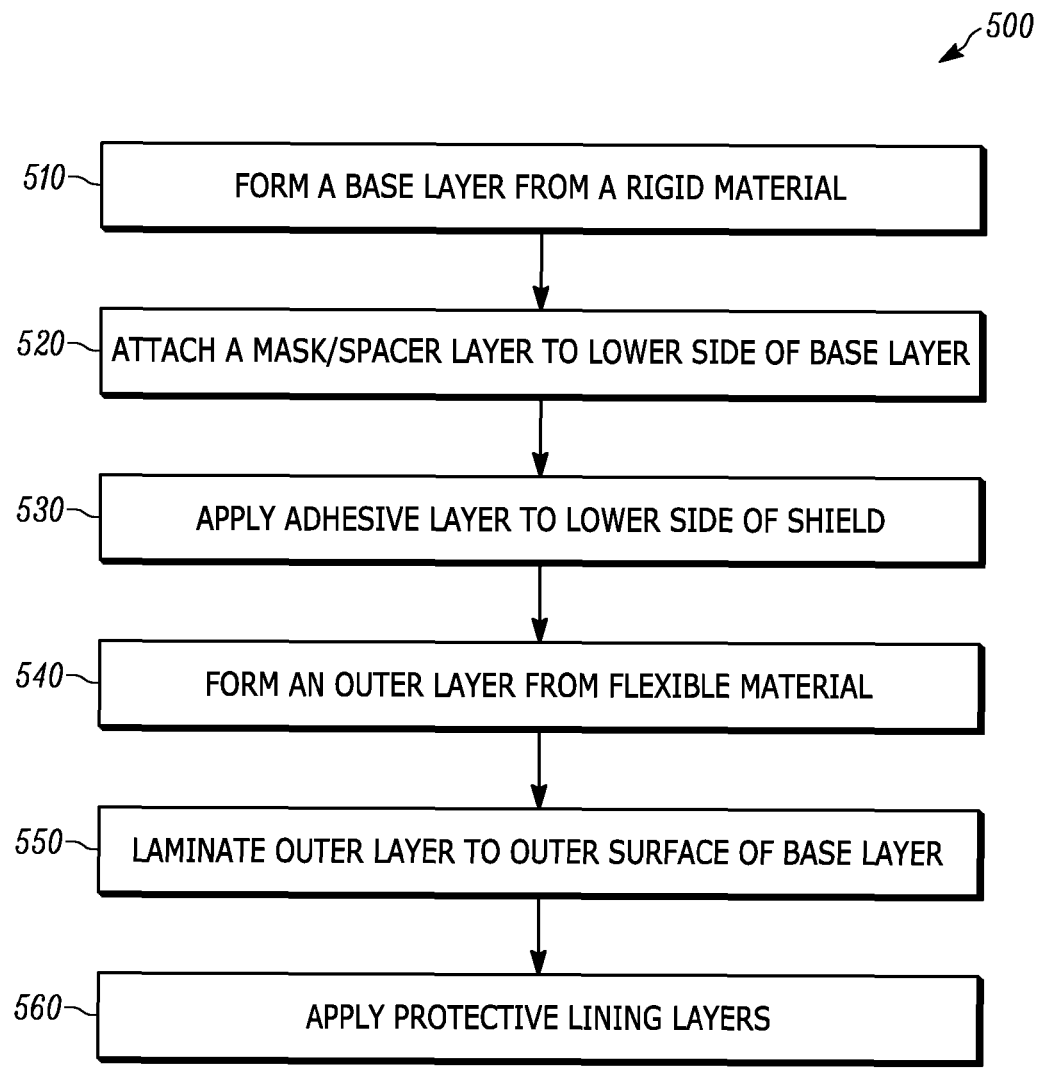
FIG. 5 is a flow diagram of a method for manufacturing protective shields in accordance with examples described herein.

The shields described herein can be manufactured by various methods. FIG. 5 is a flow diagram of one method 500 for manufacturing protective shields. The method includes forming 510 a base layer from a rigid material. The rigid material can be, or can include glass or hard plastic. The base layer is preferably transparent, or at least partially transparent such that a display surface protected by the shield can still be read through the shield. The base layer can be the base layer of any of the shields described above, and can take on a variety of sizes and shapes depending on the intended application for the shield.

The method 500 further includes laminating or attaching 520 a mask or spacer layer to the lower side (or inner side) of the base layer. The spacer can be laminated to the base layer with an adhesive, and in some examples can form a permanent laminate. Not all shields will employ spacers, and thus step 520 may not be used in all methods of manufacture.

An adhesive layer can then be laminated or applied 530 to the lower side of the shield. The adhesive layer can be applied as a full adhesive to the entirety of the lower surface of the shield, or it may be applied to only a portion of the shield. For example, the adhesive layer may be applied only to the spacer portion of the shield so that the central portion of the shield does not adhere to a central portion of a display surface. In some examples, where no spacer is used, the adhesive may be applied directly to the inner surface of the base layer and/or shield. In this manner the adhesive may be applied as a full adhesive, or as a partial adhesive application.

A cushioning layer, or outer layer is formed 540 from flexible material. In some examples, forming 540 the cushioning layer can include laminating two or more layers of flexible film together, and cutting the cushioning layer. In other examples, the cushioning layer may only include one flexible layer, and the forming 540 may only include cutting the cushioning layer from a sheet or roll of film. The outer cushioning layer may be applied 550 to the outer surface of the base layer via an intermediary adhesive, which can form a permanent adhesive.

In some examples, protective lining layers can be applied 560 to the inner and outer surfaces of the shield. The shield can then be packaged and distributed. In use, a user can remove the shield from a package, remove the lower lining layer to expose the adhesive, align the shield over the display surface of a device, and apply pressure to the shield to attach or adhere the shield to the display surface. If desired, the user may then remove the outer lining layer (if applicable), and operate a device as appropriate. If and when the shield becomes soiled, cracked, shattered, fractured, or otherwise damaged, the user can remove the shield from the display surface and install a new shield.

It should be noted that, while the above description discusses six steps of the method 500 performed in one order, the method should not be limited to only this particular order. That is, other methods may apply to some or all of the above steps in different orders. Some steps may not be performed concurrent with other steps, and some steps may not be performed at all. For example, method 500 is described as first forming 540 the cushioning layer before attaching the cushioning layer to the shield. However, in some examples, the cushioning layer could be formed as it is laminated or applied to the shield. For example, laminating 550 the outer cushioning layer could include laminating a first cushioning layer to the base layer, and then laminating a second cushioning layer to the first cushioning layer. Further, it is not necessarily significant that the spacer and adhesive layers be applied to the shield before the cushioning layer as shown in FIG. 5. In some examples, the cushioning layer can be formed and applied to the shield before, or concurrent with the application of the spacer and adhesive layers.

The present disclosure presents examples of shields 100 that protect a display surface 10 and improve the impact resistance of that surface. Because the outer cushioning layer 120 is formed from flexible material, the outer surface of the shield provides added impact absorption. This outer surface is designed to face away from the display surface 10 that the shield 100 protects. Thus, when an object strikes the shield, or when other such impact forces are exerted on the display surface, the outer cushioning layer will be the first surface contacted. Because this surface is flexible, generally softer, and more giving, the outer cushioning surface 120 will absorb and/or dissipate impact forces, thereby reducing the impact force transmitted to the display surface 10. It has also been found that, in some examples, the adhesives between the layers of the outer cushioning layer 120 further assist in absorbing of impacts, which allows multi-layered cushioning layers 120 to provide even greater impact resistance to the display surface 10.

Surprisingly, it was found that shields having a more rigid outer layer were not as efficient at absorbing and dissipating impacts as the shields with a flexible or softer layer on the outer surface. This was found even where a cushioning layer was provided on the inner surface of the base layer. That is, where a cushioning layer of flexible film or films was applied to the shield between the base layer and the display surface, the display surface did not exhibit the same improved impact resistance as when the cushioning layers were applied on the outside surface of the shield. Indeed, in some examples, shields with a rigid outer surfaces (with or without a cushioning layer on an inner surface) did not noticeably improve the impact resistance of the display surface over an unprotected surface. Summaries of these experiments are depicted in FIGS. 6 and 7.

Figure 6:
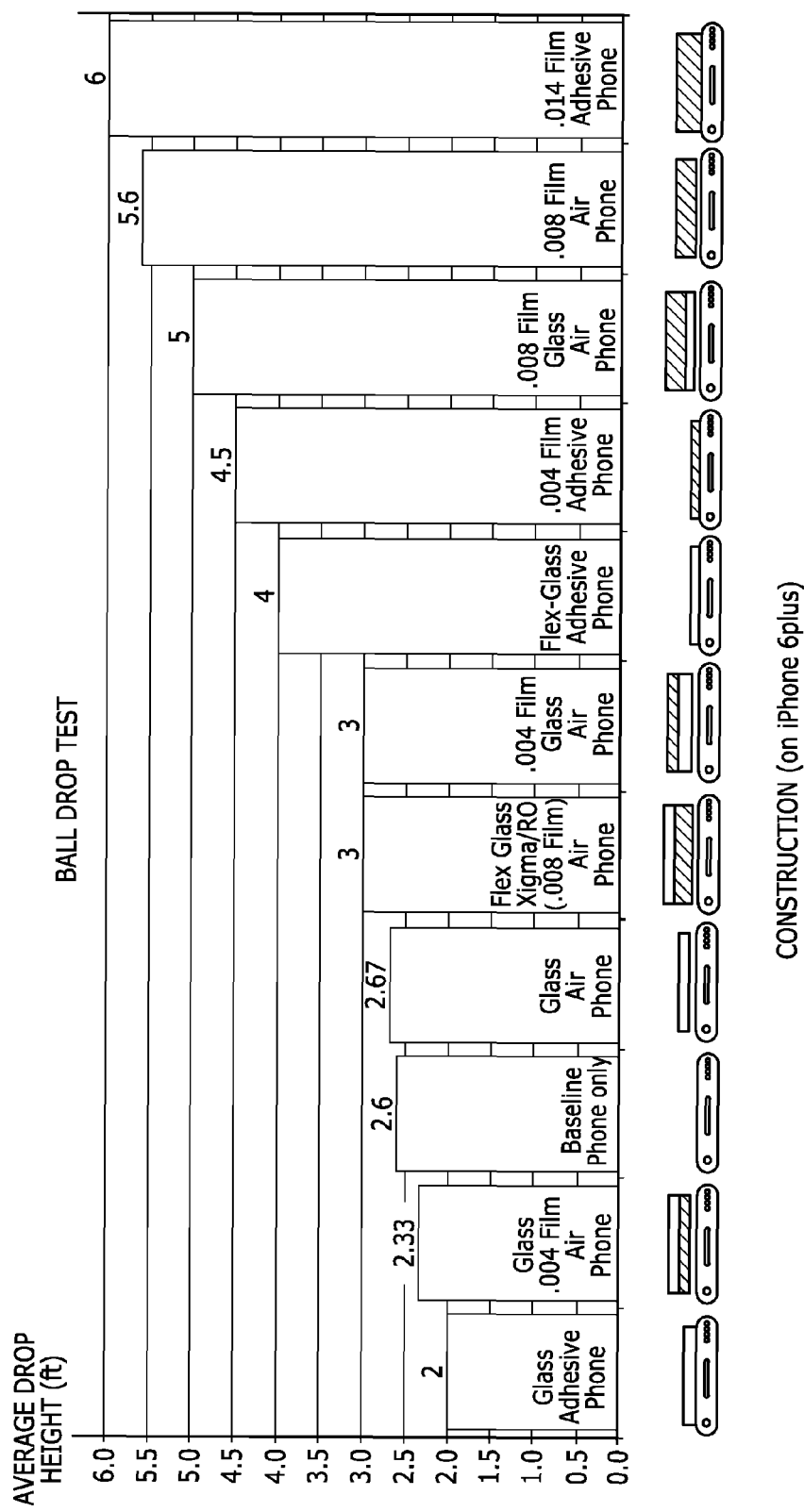
FIGS. 6 and 7 are charts demonstrating the results of experiments testing the impact resistance of display surfaces protected, or not protected, by various protective shields.
Figure 7:
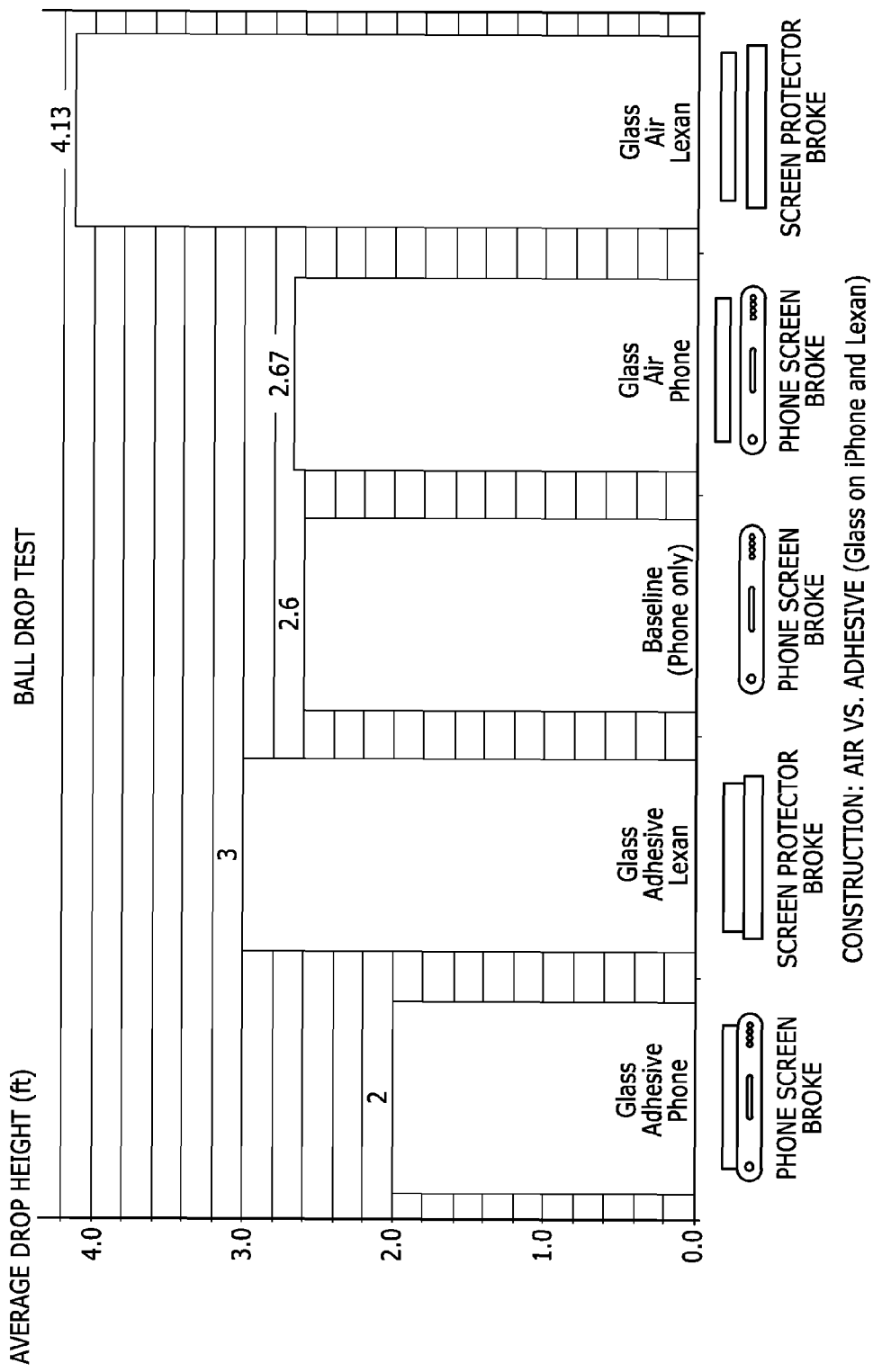

FIG. 6 is a bar chart depicting the results of a ball drop test on a display surface of an electronic device (specifically, on an IPHONE 6 PLUS device), which display surface was protected by various different protective shields (or not protected at all). The experiment involved dropping a steel ball onto the tested surface from increasing height levels until the display surface broke. The steel ball had a 78 inch outer diameter, and a weight that was about that of the electronic device (about 4.3 ounces). The electronic device was resting on a ¾ inch thick piece of medium-density fiberboard. The experiment involved first dropping the steel ball onto the surface at a level of 1 foot, and increasing the drop height 1 foot at a time until the display surface broke. The experiment was conducted several times for each display surface, and the drop height that resulted in the display surface breaking for each surface is displayed in FIG. 6.

FIG. 6 shows the results from 11 different test samples. From left to right across the graph, those test samples and their average break height are as follows:

(1) a full adhesive glass shield—average drop height to break surface 2 feet;
(2) a glass shield with a 4 mil thick spacer layer between the shield and the display surface (the "air" in the figure refers to the air gap formed by the spacer and the mounting adhesive)—average drop height to break surface of 2.33 feet;
(3) an unprotected display surface—average drop height to break surface of 2.6 feet;
(4) a glass shield with a peripheral mounting adhesive (adhesive applied directly to the base layer about only the periphery to create an air gap)—average drop height to break surface of 2.67 feet;
(5) a flex glass shield (sold by VERIZON and BELKEN) with an 8 mil spacer layer (formed of material sold by XIGMA and RACING OPTICS) and an air gap—average drop height to break surface of 3 feet;
(6) a glass shield with a 4 mil flexible film layer applied to the base layer, and a peripheral mounting adhesive to form an air gap average drop height to break surface of 3 feet;
(7) a flex glass shield with a full adhesive—average drop height to break surface of 4 feet;
(8) a 4 mil flexible film shield with a full adhesive—average drop height to break surface of 4.5 feet;
(9) a glass shield with an 8 mil flexible film layer applied to the base layer, and a peripheral mounting adhesive to form an air gap—average drop height to break surface of 5 feet;
(10) an 9 mil flexible film shield with a peripheral mounting adhesive to form an air gap—average drop height to break surface of 5.6 feet;
(11) a 14 mil flexible film shield with full adhesive—average drop height to break surface of 6 feet.

The results of the experiment demonstrate that test samples employing glass provide an increased impact resistance where the shield employs a flexible film layer on the outer surface. For instance, sample 6, which employs a 4 mil flexible film layer applied to glass and an air gap demonstrates a 0.33 foot improvement over a sample 4, which employs a similar glass shield without a flexible outer layer. More significantly, sample 9, which includes an 8 mil flexible outer layer demonstrates a 2.33 foot improvement over sample 4.

The experiment also surprisingly discovered that glass shields using a flexible film layer on the outer surface demonstrated significant improvement over glass shields that employed a flexible film layer only on the inner surface of the shield. For example, sample 2, which employed a flexible spacer layer between the base glass layer and the display surface did not significantly improve the impact resistance of the display surface, particularly when compared to similar shields with a flexible layer on the outer surface of the shield (e.g., samples 6 and 9.

FIG. 7 provides another experiment that tests the protective qualities of a glass shield that uses an air gap versus a full adhesive. In the experiment of FIG. 7, the same steel ball was dropped on either a screen of an electronic device (IPHONE 6PLUS), or on a shield alone, until either the display surface or the shield itself broke. Lone shields were applied to a Lexan polycarbonate material. FIG. 7 shows the results from five different test samples. From left to right across the graph, those test samples and their average break height are as follows:

(1) a screen was protected by a glass shield with a full adhesive (same as sample 1 from the experiment of FIG. 6)—average drop height to break the phone display surface of 2 feet;
(2) a glass shield with full adhesive applied to Lexan— average drop height to break shield was 3 feet;
(3) an unprotected screen (same as sample 3 from the experiment of FIG.
6)—average drop height to break surface of 2.6 feet;
(4) a glass shield applied to a screen with an air gap (same as sample 4 from the experiment of FIG. 6)—average drop height to break surface of 2.67 feet;
(5) a glass shield with an air gap applied to LEXAN— average drop height to break surface of 4.13 feet.

The results of the experiment of FIG. 7 show that the surface of a screen protected by a glass only shield will tend to break before the glass shield itself will break. Accordingly, it was glass shields without a flexible outer layer provide little in the way of improved impact resistance to the protected display surfaces.

Specific examples of protective shields will now be described in detail. The specific descriptions may reference the figures and objects of the figures as examples of components and other features that may correspond to the described elements. It should be noted that these references are merely exemplary, and should not be considered as limiting.

In one example, a shield (e.g., shield 100) for protecting a display surface includes a rigid base layer (e.g., rigid base layer 110). The rigid base layer has a shape that corresponds to the display surface. The base layer is formed from, or comprises glass, and has a thickness of between about 10 mils and about 15 mils, or more specifically, about 0.3 mm. The shield has a first adhesive layer (e.g., a mounting adhesive layer 140) applied to a lower surface of the shield (e.g., to the inner surface 111 of the base layer 110, and/or to a spacer layer 130). The first adhesive layer is configured to attach (e.g., removably attach) the shield to the display surface. In one version of the exemplary shield, the first adhesive layer is applied as a full adhesive (e.g., adhesive layer 240) to the lower surface of the base layer. In another version, the shield has an annular layer (e.g., a spacer 130) that surrounds a central portion of the base layer, and the adhesive layer (e.g., adhesive layer 140) is applied only to the annular layer. In still another version, the adhesive layer is applied directly to the base layer, but only about an outer perimeter of the base layer, leaving the central portion of the shield free of a mounting adhesive. The shield also includes an outer layer (e.g., cushioning layer 120) applied to an upper surface (e.g., outer surface 112) of the shield. The outer layer is, or includes a flexible film material, and is laminated to the base layer via a second adhesive layer. The second adhesive layer forms a permanent laminate between the base layer and the outer layer. The outer layer is formed from multiple flexible film layers laminated together with an adhesive (e.g., a permanent adhesive). For example, the outer layer may include a lower flexible film layer (e.g., lower layer 122) laminated to the base layer via a second adhesive (e.g., adhesive layer 121) and an upper flexible film layer (e.g., outer layer 124) laminated to the lower flexible film layer via a third adhesive (e.g., bonding adhesive layer 123). The upper and lower flexible film materials each have a thickness between about 3 mils and about 5 mils, more specifically, about 0.1 mm each. The upper flexible film layer has a hard coating. The shield is configured to attach to the display surface with the outer layer facing away from the display surface. The outer layer of the exemplary shield increases the impact resistance of the shield and/or the impact resistance of the display surface that the shield attaches to. That is, a shield with the outer layer (or a display surface protected by a shield with the outer layer) may be able to withstand higher impact forces without breaking than it otherwise would be able to without such an outer layer.

In another example, a touch screen electronic device (e.g., device 1) is protected with a protector (e.g., shield 200). The device includes a touch screen interface (e.g., display surface 10) for operating the touch screen device. The protector includes a rigid base layer (e.g., base layer 210) with an upper surface (e.g., outer surface 212) and a lower surface (e.g., inner surface 211), and a shape that corresponds to the shape of the touch screen. The base layer is made from glass, or at least comprises a glass material (e.g., the base layer is a glass/plastic composite). A mounting adhesive layer (e.g., adhesive layer 240) applied to the lower surface of the base layer and/or the protector removably attaches the protector to the touch screen. The protector has an outer layer (e.g., cushioning layer 220) laminated to the upper surface of the base layer via a bonding adhesive layer (e.g., adhesive layer 221), and the outer layer includes at least two flexible film layers (e.g., layers 222 and 224) laminated together via an intermediary adhesive layer (e.g., adhesive layer 223). The protector is attached to the touch screen surface with the outer layer facing away from the display surface so that a user operating the touch screen device will contact the outer surface. The touch screen remains touch sensitive even through the mounted protector.

The present disclosure describes preferred embodiments and examples of a display surface protector shield. Those skilled in the art will recognize that a wide variety of modifications, alterations, and combinations can be made with respect to the above described protector shields without departing from the scope of the invention as set forth in the claims, and that such modifications, alterations, and combinations are to be viewed as being within the ambit of the inventive concept. In addition, it should also be understood that features of one embodiment described herein may be combined with features of other embodiments described herein to provide yet other embodiments as desired. All references cited in the present disclosure are hereby incorporated by reference in their entirety.

The invention claimed is:

1. A shield for protecting a display surface, the shield comprising:
a rigid base layer having a shape that corresponds to the display surface, the rigid base layer formed from a material that comprises glass;
a first adhesive layer applied to a lower surface of the shield, the first adhesive configured to removably attach the shield to the display surface; and
an outer layer applied to an upper surface of the shield, the outer layer comprising a flexible film material; and
a second adhesive layer adhering the outer layer to the base layer;
wherein the shield is configured to attach to the display surface with the outer layer facing away from the display surface.

2. A display surface shield comprising:
a rigid base layer having a shape that corresponds to a shape of a display surface comprising a touch screen, the rigid base layer comprising a first material;
a first adhesive layer applied about a lower surface of the shield, the first adhesive layer configured to removably attach the shield to the display surface;
a flexible outer layer forming an upper surface of the shield that is opposite the first adhesive on the lower surface of the shield, the flexible outer layer comprising a second material; and
a second adhesive layer adhering the outer layer to the base layer;
wherein the shield is configured to attach to the display surface so that, upon removably attaching the shield to the display surface, the flexible outer layer faces away from the display surface, wherein the second material is a different material than the first material such that the flexible outer layer is softer and more flexible relative to the rigid base layer, and wherein the shield is configured to attach to the display surface so that the touch screen maintains touch sensitivity through the attached shield.

3. The shield of claim 1, wherein the flexible outer layer of an attached shield increases the impact resistance of the shield.

4. The shield of claim 1, wherein the rigid base layer comprises glass.

5. The shield of claim 1, wherein the flexible outer layer comprises at least two film layers laminated together via a third adhesive layer, wherein the at least two film layers comprise a flexible film material.

6. The shield of claim 1, wherein the flexible outer layer comprises PET.

7. The shield of claim 1, wherein the flexible outer layer comprises a lower flexible film layer laminated to the base layer via the second adhesive layer, and an upper flexible film layer laminated to the lower flexible film layer via a third adhesive layer, wherein the upper flexible film layer comprises a hard coating on an upper surface of the upper flexible film layer, and wherein the upper and lower flexible film materials have a thickness between about 3 mils and about 5 mils.

8. The shield of claim 7, wherein the second adhesive layer forms a permanent bond between the lower flexible film layer and the base layer, and the and the third adhesive layer forms a permanent bond between the upper flexible film layer and the lower film layer via the third adhesive layer.

9. The shield of claim 1, wherein the base layer has a thickness of between about 10 mils and about 15 mils.

10. The shield of claim 1, wherein the first adhesive layer is applied about an outer periphery of the shield and surrounds a central portion of the shield so that the shield is configured to attach to the display surface without the central portion of the shield adhering to a central portion of the display surface.

11. The shield of claim 10, further comprising an annular layer positioned between the first adhesive layer and the base layer, the annular layer surrounding a central portion of the base layer.

12. The shield of claim 11, wherein the annular layer and the first adhesive layer have a combined thickness sufficient to lift at least a portion of the base layer off the central portion of the display surface.

13. The shield of claim 12, wherein the base layer is sufficiently stiff to maintain a minimum separation between the base layer and the central portion of the display surface in a resting configuration, wherein the minimum separation distance is large enough to inhibit the formation of optical artifacts.

14. The shield of claim 1, wherein the first adhesive layer is applied to a majority of the lower surface of the shield so that the shield is configured to attach to the display surface without forming a gap there between.

15. The shield of claim 1, wherein the display surface is a glass surface.

16. A touch screen protector comprising:
a base layer having an upper surface, a lower surface opposite the upper surface, and a shape that corresponds to a shape of a touch screen of an electronic device, the base layer comprising a glass material having a thickness of about 10 to about 15 mils;
a mounting adhesive layer applied about a lower surface of the shield configured to attach the protector to the touch screen; and
an outer cushioning laminate adhered to the upper surface of the base layer opposite the mounting adhesive, the outer cushioning laminate comprising at least two flexible film layers laminated together, at least one of the at least two flexible film layers formed from a material different from glass,
wherein the protector is configured to attach to the touch screen surface so that, upon attaching the protector to the touch screen surface, the flexible outer laminate faces away from the touch screen surface, wherein the cushioning laminate is softer and more flexible than the base layer, wherein the attached protector increases the impact resistance of the touch screen, and wherein the protector is configured so that the touch screen maintains touch sensitivity through the attached shield.

17. The protector of claim 16, wherein the cushioning laminate comprises a lower film layer comprising PET, an upper film layer comprising PET, an intermediary adhesive layer forming a permanent bond between the upper and lower film layers, and a bonding adhesive layer forming a permanent bond between the cushioning laminate and the base layer, wherein the upper flexible film layer comprises a hard coating on an upper surface, and wherein the upper and lower flexible film materials have a thickness of between about 3 mils and about 5 mils.

18. The protector of claim 16, further comprising an annular layer applied between the lower surface of the base layer and the mounting adhesive layer, the annular layer surrounding a central portion of the base layer, wherein the mounting adhesive layer is applied to the annular layer so that the protector attaches to the touch screen surface without the central portion of the protector adhering to a central portion of the display surface, and wherein the annular layer and the mounting adhesive layer have a combined thickness sufficient to lift at least a portion of the base layer off the central portion of the display surface.

19. The protector of claim 16, wherein the mounting adhesive layer is configured to removably attach the protector to the touch screen.

20. The protector of claim 16, wherein the at least two flexible film layers are laminated together such that the outer cushioning laminate is a permanent laminate.

21. A display surface shield comprising:
a rigid base layer having a shape that corresponds to a shape of a display surface, the rigid base layer comprising a first material;
a first adhesive layer applied to a lower surface of the shield, the first adhesive configured to removably attach the shield to the display surface; and
a flexible outer layer laminated to an upper surface of the shield that is opposite the lower surface of the shield, the flexible outer layer comprising a second material, the second material is a different material than the first material;
a second adhesive layer adhering the outer layer to the base layer; and
an annular layer positioned between the first adhesive layer and the base layer, the annular layer surrounding a central portion of the base layer;
wherein the shield is configured to attach to the display surface with the outer layer facing away from the display surface,
wherein the first adhesive layer is applied about an outer periphery of the shield and surrounds a central portion of the shield so that the shield is configured to attach to the display surface without the central portion of the shield adhering to a central portion of the display surface,
wherein the annular layer and the first adhesive layer have a combined thickness sufficient to lift at least a portion of the base layer off the central portion of the display surface,
wherein the base layer is sufficiently stiff to maintain a minimum separation between the base layer and the central portion of the display surface in a resting configuration, wherein the minimum separation distance is large enough to inhibit the formation of optical artifacts,
wherein the shield is pre-formed with a convex curvature, wherein the convex curvature facilitates maintaining the minimum separation between the base layer and the central portion of the display surface in the resting configuration.

* * * * *